US012554930B2

(12) United States Patent
Cheng et al.

(10) Patent No.: US 12,554,930 B2
(45) Date of Patent: Feb. 17, 2026

(54) TRANSFORMER-BASED TEXT ENCODER FOR PASSAGE RETRIEVAL

(71) Applicant: Microsoft Technology Licensing, LLC, Redmond, WA (US)

(72) Inventors: Hao Cheng, Kirkland, WA (US); Hao Fang, Seattle, WA (US); Xiaodong Liu, Redmond, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 17/938,173

(22) Filed: Oct. 5, 2022

(65) Prior Publication Data

US 2024/0126993 A1    Apr. 18, 2024

(51) Int. Cl.
*G06F 40/30*      (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS

| 8,346,701 | B2 | 1/2013 | Wang et al. |
| 8,473,499 | B2 | 6/2013 | Song et al. |
| 8,639,177 | B2 | 1/2014 | Hines et al. |
| 9,792,827 | B2 | 10/2017 | Abraham et al. |
| 10,380,150 | B2 | 8/2019 | Huang et al. |
| 10,402,435 | B2 | 9/2019 | Jain et al. |
| 10,664,662 | B2 | 5/2020 | Awadallah et al. |
| 10,872,083 | B2 | 12/2020 | Lin et al. |
| 11,379,736 | B2 | 7/2022 | Trischler et al. |
| 2007/0038623 | A1 | 2/2007 | Huet |
| 2019/0005385 | A1 | 1/2019 | Celikyilmaz et al. |
| 2020/0211408 | A1 | 7/2020 | Faulkner et al. |

(Continued)

OTHER PUBLICATIONS

Damani et al. "Optimized Transformer Models for FAQ Answering", PAKDD 2020, LNAI 12084, pp. 235-248, 2020. (Year: 2020).*

(Continued)

*Primary Examiner* — Nicole A K Schmieder
(74) *Attorney, Agent, or Firm* — Alleman Hall LLP

(57) ABSTRACT

A computing system includes a logic subsystem and a storage subsystem holding instructions executable by the logic subsystem to implement a transformer-based text encoder. The transformer-based text encoder includes a plurality of transformer blocks previously-trained to apply encoding operations to computer-readable text representations of input text strings, the computer-readable text representations including computer-readable question representations of input text questions, and computer-readable passage representations of input text passages. The plurality of transformer blocks include a shared transformer block trained for both the computer-readable question representations and the computer-readable passage representations and a specialized transformer block including two or more input-specific subnetworks, and a routing function to select an input-specific subnetwork of the two or more input-specific subnetworks for each of the computer-readable text representations.

20 Claims, 12 Drawing Sheets

(56) References Cited

U.S. PATENT DOCUMENTS

2021/0089594 A1 3/2021 Xiong et al.
2022/0253447 A1 8/2022 Boytsov

OTHER PUBLICATIONS

Zhao and Huang, "Bert-QAnet: BERT-encoded hierarchical question-answer cross-attention network for duplicate question detection", Neurocomputing 509, Aug. 2022 (Year: 2022).*

Ba, et al., "Layer Normalization", In Repository of arXiv:1607.06450v1, Jul. 21, 2016, 14 Pages.

Baudiš, et al., "Modeling of the Question Answering Task in the YodaQA System", In Proceedings of 6th International Conference of the Cross-Language Evaluation Forum for European Languages, Sep. 8, 2015, pp. 222-228.

Berant, et al., "Semantic Parsing on Freebase from Question-Answer Pairs", In Proceedings of Conference on Empirical Methods in Natural Language Processing, Oct. 18, 2013, pp. 1533-1544.

Chang, et al., "Pre-Training Tasks for Embedding-Based Large-Scale Retrieval", In Proceedings of 8th International Conference on Learning Representations, Apr. 26, 2020, 12 Pages.

Chen, et al., "Reading Wikipedia to Answer Open-Domain Questions", In Proceedings of the 55th Annual Meeting of the Association for Computational Linguistics, vol. 1: Long Papers, Jul. 30, 2017, pp. 1870-1879.

Chen, et al., "Salient Phrase Aware Dense Retrieval: Can A Dense Retriever Imitate A Sparse One?", In Repository of arXiv:2110.06918v2, Mar. 12, 2022, 13 Pages.

Devlin, et al., "BERT: Pre-Training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Fedus, et al., "Switch Transformers: Scaling to Trillion Parameter Models with Simple and Efficient Sparsity", In Repository of arXiv:2101.03961v1, Jan. 11, 2021, 31 Pages.

Gao, et al., "Condenser: A Pre-Training Architecture for Dense Retrieval", In Proceedings of the Conference on Empirical Methods in Natural Language Processing, Nov. 7, 2021, pp. 981-993.

Gao, et al., "Unsupervised Corpus Aware Language Model Pre-training for Dense Passage Retrieval", In Proceedings of the 60th Annual Meeting of the Association for Computational Linguistics, vol. 1: Long Papers, May 22, 2022, pp. 2843-2853.

Guu, et al., "REALM: Retrieval-Augmented Language Model Pre-Training", In Proceedings of the 37th International Conference on Machine Learning, Jul. 13, 2020, 10 Pages.

Hasibi, et al., "DBpedia-Entity v2: A Test Collection for Entity Search", In Proceedings of the 40th International ACM SIGIR Conference on Research and Development in Information Retrieval, Aug. 7, 2017, pp. 1265-1268.

He, et al., "Deep Residual Learning for Image Recognition", In Proceedings of the IEEE Conference on Computer Vision and Pattern Recognition, Jun. 27, 2016, pp. 770-778.

He, et al., "Momentum Contrast for Unsupervised Visual Representation Learning", In Proceedings of the IEEE/CVF Conference on Computer Vision and Pattern Recognition, Jun. 13, 2020, pp. 9729-9738.

Izacard, et al., "Towards Unsupervised Dense Information Retrieval with Contrastive Learning", In Repository of arXiv:2112.09118v1, Dec. 16, 2021, 15 Pages.

Jacobs, et al., "Adaptive Mixtures of Local Experts", In Journal of Neural Computation, vol. 3, Issue 1, Mar. 1991, pp. 79-87.

Jang, et al., "Categorical Reparameterization with Gumbel-Softmax", In Repository of arXiv:1611.01144v1, Nov. 3, 2016, 13 Pages.

Jones, Karen S. , "A Statistical Interpretation of Term Specificity and its Application in Retrieval", In Journal of Documentation, vol. 28, Issue 1, Jan. 1, 1972, 9 Pages.

Joshi, et al., "TriviaQA: A Large Scale Distantly Supervised Challenge Dataset for Reading Comprehension", In Proceedings of the 55th Annual Meeting of the Association for Computational Linguistics, vol. 1: Long Papers, Jul. 30, 2017, pp. 1601-1611.

Karpukhin, et al., "Dense Passage Retrieval for Open-Domain Question Answering", In Proceedings of the Conference on Empirical Methods in Natural Language Processing, Nov. 16, 2020, pp. 6769-6781.

Kingma, et al., "Adam: A Method for Stochastic Optimization", In Repository of arXiv:1412.6980v1, Dec. 22, 2014, 9 Pages.

Kwiatkowski, et al., "Natural Questions: A Benchmark for Question Answering Research", In Journal of Transactions of the Association for Computational Linguistics, vol. 7, Jul. 2019, pp. 453-466.

Lakhotia, et al., "Domain-Matched Pre-Training Tasks for Dense Retrieval", In Repository of arXiv:2107.13602v1, Jul. 28, 2021, 10 Pages.

Lebret, et al., "Neural Text Generation from Structured Data with Application to the Biography Domain", In Proceedings of the Conference on Empirical Methods in Natural Language Processing, Nov. 1, 2016, pp. 1203-1213.

Lee, et al., "Latent Retrieval for Weakly Supervised Open Domain Question Answering", In Proceedings of the 57th Annual Meeting of the Association for Computational Linguistics, Jul. 28, 2019, pp. 6086-6096.

Lewis, et al., "PAQ: 65 Million Probably-Asked Questions and What You Can Do With Them", In Journal of Transactions of the Association for Computational Linguistics, vol. 9, Oct. 7, 2021, pp. 1098-1115.

Lewis, et al., "Retrieval-Augmented Generation for Knowledge-Intensive NLP Tasks", In Proceedings of 34th Conference on Neural Information Processing Systems, Dec. 6, 2020, 16 Pages.

Liu, et al., "RoBERTa: A Robustly Optimized BERT Pretraining Approach", In Repository of arXiv:1907.11692v1, Jul. 26, 2019, 13 Pages.

Luan, et al., "Sparse, Dense, and Attentional Representations for Text Retrieval", In Journal of Transactions of the Association for Computational Linguistics, vol. 9, Apr. 26, 2021, pp. 329-345.

Ma, et al., "A Replication Study of Dense Passage Retriever", In Repository of arXiv:2104.05740v1, Apr. 12, 2021, 8 Pages.

Min, et al., "A Discrete Hard EM Approach for Weakly Supervised Question Answering", In Proceedings of the Conference on Empirical Methods in Natural Language Processing and the 9th International Joint Conference on Natural Language Processing, Nov. 3, 2019, pp. 2851-2864.

Min, et al., "Dense Passage Retrieval", Retrieved from: https://github.com/facebookresearch/DPR/tree/a31212dc0a54dfa85d8bfa01e1669f149ac832b7#new-march-2021-retrieval-model, Mar. 9, 2022, 11 Pages.

Nie, et al., "Revealing the Importance of Semantic Retrieval for Machine Reading at Scale", In Proceedings of the Conference on Empirical Methods in Natural Language Processing and the 9th International Joint Conference on Natural Language Processing, Nov. 3, 2019, pp. 2553-2566.

Petroni, et al., "KILT: A Benchmark for Knowledge Intensive Language Tasks", In Proceedings of the Conference of the North American Chapter of the Association for Computational Linguistics: Human Language Technologies, Jun. 6, 2021, pp. 2523-2544.

Qu, et al., "RocketQA: An Optimized Training Approach to Dense Passage Retrieval for Open-Domain Question Answering", In Proceedings of the Conference of the North American Chapter of the Association for Computational Linguistics: Human Language Technologies, Jun. 6, 2021, pp. 5835-5847.

Rajpurkar, et al., "SQuAD: 100,000+ Questions for Machine Comprehension of Text", In Proceedings of the Conference on Empirical Methods in Natural Language Processing, Nov. 1, 2016, pp. 2383-2392.

Robertson, et al., "Some Simple Effective Approximations to the 2-Poisson Model for Probabilistic Weighted Retrieval", In Proceedings of the 17th Annual International ACM SIGIR Conference on Research and Development in Information Retrieval, Aug. 1, 1994, pp. 232-241.

(56) References Cited

OTHER PUBLICATIONS

Sciavolino, et al., "Simple Entity-Centric Questions Challenge Dense Retrievers", In Proceedings of the Conference on Empirical Methods in Natural Language Processing, Nov. 7, 2021, pp. 6138-6148.

Shazeer, et al., "Outrageously Large Neural Networks: The Sparsely-Gated Mixture-of-Experts Layer", In Proceedings of International Conference on Learning Representations, Mar. 1, 2017, 19 Pages.

Thakur, et al., "BEIR: A Heterogeneous Benchmark for Zero-Shot Evaluation of Information Retrieval Models", In Proceedings of 35th Conference on Neural Information Processing Systems Datasets and Benchmarks Track (Round 2), Aug. 19, 2021, 16 pages.

Thorne, et al., "FEVER: A Large-Scale Dataset for Fact Extraction and VERification", In Proceedings of the Conference of the North American Chapter of the Association for Computational Linguistics: Human Language Technologies, vol. 1 (Long Papers), Jun. 1, 2018, pp. 809-819.

Vaswani, et al., "Attention is All You Need", In Proceedings of Advances in Neural Information Processing Systems, vol. 30, Dec. 4, 2017, 11 Pages.

Wachsmuth, et al., "Retrieval of the Best Counterargument without Prior Topic Knowledge", In Proceedings of the 56th Annual Meeting of the Association for Computational Linguistics, vol. 1: Long Papers, Jul. 15, 2018, pp. 241-251.

Wolfson, et al., "Break It Down: A Question Understanding Benchmark", In Journal of Transactions of the Association for Computational Linguistics, vol. 8, Apr. 1, 2020, pp. 183-198.

Xiong, et al., "Approximate Nearest Neighbor Negative Contrastive Learning for Dense Text Retrieval", In Repository of arXiv:2007.00808v1, Jul. 1, 2020, 15 Pages.

Yang, et al., "End-to-End Open-Domain Question Answering with BERTserini", In Proceedings of the Conference of the North American Chapter of the Association for Computational Linguistics (Demonstrations), Jun. 2, 2019, pp. 72-77.

Yang, et al., "HotpotQA: A Dataset for Diverse, Explainable Multi-Hop Question Answering", In Proceedings of the Conference on Empirical Methods in Natural Language Processing, Oct. 31, 2018, pp. 2369-2380.

Yang, et al., "xMoCo: Cross Momentum Contrastive Learning for Open-Domain Question Answering", In Proceedings of the 59th Annual Meeting of the Association for Computational Linguistics and the 11th International Joint Conference on Natural Language Processing, vol. 1: Long Papers, Aug. 1, 2021, pp. 6120-6129.

Cheng et al., "Task-Aware Specialization for Efficient and Robust Dense Retrieval for Open-Domain Question Answering," arxiv, XP093110482, 11 pages, Oct. 11, 2022. Retrieved from the Internet : URL: https://arxiv.org/pdf/2210.05156v1.pdf.

Fedus et al., "Switch transformers: scaling to trillion parameter models with simple and efficient sparsity", arXiv (Cornell University), XP093110486, pp. 1-40, Jun. 16, 2022. Retrieved from the Internet: URL: https://arxiv.org/pdf/2101.03961.pdf, retrieved on Dec. 8, 2023.

International Search Report and Written Opinion received for PCT Application No. PCT/US2023/032228, mailed on Dec. 22, 2023, 15 pages.

Karpukhin et al., "Dense Passage Retrieval for Open-Domain Question Answering", Proceedings of The 2020 Conference on Empirical Methods in Natural Language Processing (EMNLP), XP093110490, Retrieved from the Internet: URL: https://aclanthology.org/2020.emnlp-ma in.550.pdf>, Nov. 16, 2020, pp. 6769-6781.

Zhou et al., "Build a Robust QA System with Transformer-based Mixture of Experts," arXiv (Cornell University), XP093110518, pp. 1-9, Mar. 20, 2022. Retrieved from the Internet : URL:https://arxiv.org/pdf/2204.09598.pdf [retrieved on Dec. 8, 2023].

* cited by examiner

TRANSFORMER-BASED TEXT ENCODER FOR PASSAGE RETRIEVAL

BACKGROUND

Passage retrieval is used to identify a text passage, or a specific portion of text within a passage, that is relevant to an input question. After receiving an input question such as "Who is the current president of the United States?" a passage retrieval system evaluates a number of different text passages (e.g., documents, webpages) to determine which is most relevant to the input question, and therefore most likely to include the requested information.

This can be accomplished using transformer-based text encoders, which convert input text sequences (e.g., strings of letters, numerals, punctuation, and other characters) into computer-readable representations of the text sequences that can be compared to one another. For instance, the input question and each text passage can be encoded as vectors. The passage retrieval system then selects one particular passage as being most relevant to the input question by calculating the dot products between the vector representing the question, and the vectors representing the different passages, to determine which passage vector is most similar to the question vector.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure generally describes a transformer-based text encoder that includes a shared transformer block and a specialized transformer block. The specialized transformer block includes a routing function that routes input text representations between different input-specific subnetworks. In one embodiment, the routing function routes question representations to a question-specific subnetwork of the specialized transformer block, while passage representations are routed to a passage-specific subnetwork of the specialized transformer block. The shared transformer block is trained for both question representations and passage representations. In this manner, a single transformer-based text encoder can be used to encode both input text questions and input text passages.

DETAILED DESCRIPTION

Figure 1:
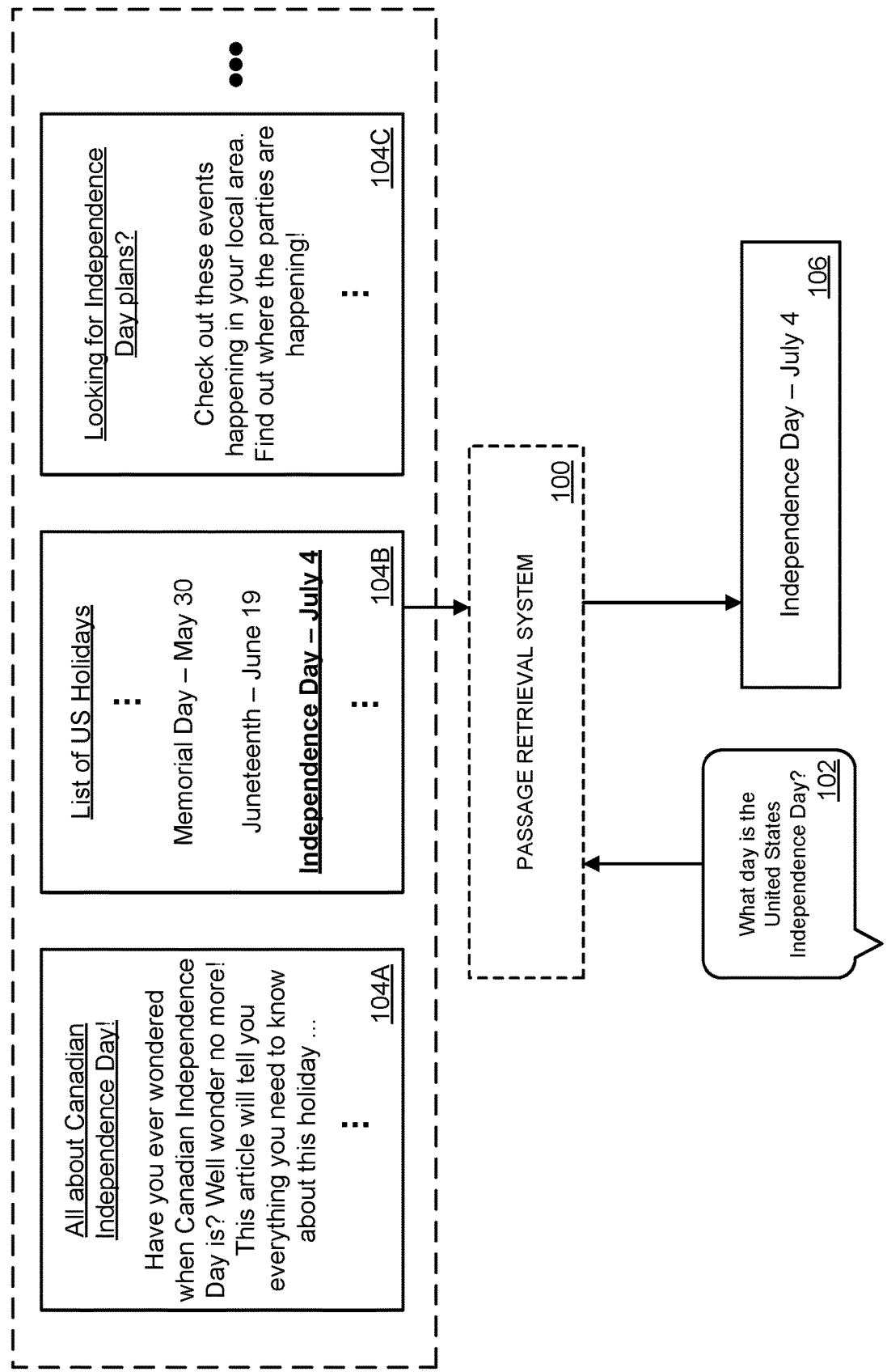
FIG. 1 schematically illustrates passage retrieval based on an input text question.

A dense retrieval framework is very useful for fetching external knowledge in various text processing tasks. For open domain question answering (ODQA), a well-performing dense retriever is the bi-encoder architecture, including a question encoder and a passage encoder. In some implementations, the two encoders are isomorphic but separately parameterized, as they are initialized from the same pre-trained model and then fine-tuned on the task.

Despite its usefulness, the bi-encoder architecture has notable drawbacks. First, from the standpoint of efficiency, bi-encoder parameterization can cause scaling bottlenecks during both training and inference. Second, it is believed that bi-encoder dense retrievers underperform sparse information retrieval models in various settings, such as BM25. It is also believed that bi-encoder dense retrievers are more sensitive to distribution shift than sparse information retrieval models, resulting in poor generalization on questions with rare entities.

Accordingly, the present disclosure describes a transformer-based text encoder useable both for input questions and input passages. Instead of using two different isomorphic and decoupled encoders for questions and passages, the transformer-based text encoder described herein includes at least one "shared" transformer block, and at least one "specialized" transformer block. The shared transformer block is trained both for questions and passages, while the specialized transformer block includes different input-specific subnetworks used for different encoding tasks. In one example, the specialized transformer block includes a question-specific subnetwork for encoding input questions, and a passage-specific subnetwork for encoding input passages.

In some embodiments, the text encoder includes several shared transformer blocks and several specialized transformer blocks interleaved with one another—e.g., the output from a shared transformer block is passed to a specialized transformer block, and the output of the specialized transformer block is passed to another shared transformer block, and so on. For the sake of simplicity, the present disclosure primarily describes the transformer-based text encoder as having one shared transformer block and one specialized transformer block, although it will be understood that this is not limiting—rather, the transformer-based text encoder has at least one shared transformer block, and at least one specialized transformer block.

Use of shared and specialized transformer blocks in this manner provides the technical benefit of reducing consumption of computer resources, as at least some network parameters are shared between the encoding operations applied to questions and passages. This is contrary to bi-encoder architectures, in which the question encoder and passage encoder are separately parameterized. Furthermore, use of the transformer-based text encoder described herein provides the technical benefit of improving human computer interaction, by providing for more accurate and resource-efficient passage retrieval across a wide range of question domains, as compared to other passage retrieval solutions.

FIG. 1 schematically illustrates an example passage retrieval scenario. It will be understood that FIG. 1 is non-limiting and is highly simplified for the sake of explanation. FIG. 1 schematically shows an example passage retrieval system 100. The passage retrieval system is generally useable to identify a text passage, or a specific portion of a text passage, that is relevant to an input text question. This is done via a transformer-based text encoder having a shared transformer block and a specialized transformer block, as will be described in more detail below.

In FIG. 1, the passage retrieval system receives an input text question 102. The passage retrieval system encodes the input text question and compares it to encoded representations of several different input text passages, including passages 104A, 104B, and 104C. As shown, passages 104A and 104C share some similarity to the input text question, but ultimately do not include the requested information. By contrast, text passage 104B includes an answer to the input text question, and thus a portion 106 of the text passage is retrieved by the passage retrieval system as a response to the input text question. In other examples, the passage retrieval system retrieves the entire passage identified as being most relevant to the input text question, instead of only retrieving a portion of the passage as is shown in FIG. 1.

The passage retrieval system is implemented via any suitable computing system of one or more computing devices, each having any suitable capabilities, hardware configuration, and form factor. In some embodiments, the passage retrieval system is implemented via two or more different computing devices communicating over a network, such as the Internet. As one non-limiting example, the passage retrieval system is implemented as computing system 1000 described below with respect to FIG. 10.

It will be understood that the input text question and input text passages each take any suitable form and have any suitable source. In some examples, the input text question is composed by a human user—e.g., typed into a search bar, or spoken aloud into a microphone and speech-to-text processed. In other examples, the input text question has another suitable source—e.g., loaded from computer storage, or received over a computer network. Similarly, the input text passages are in some cases held in local storage of the passage retrieval computing system—e.g., the input text passages are text documents or database entries. Additionally, or alternatively, the input text passages can be accessed over a computer network, such as the Internet. For instance, as one example, an input text passage takes the form of a webpage accessed from a remote server. It will be understood that the present disclosure is primarily concerned with use of a transformer-based text encoder to perform passage retrieval, regardless of the specific source and contents of the questions and passages to be encoded.

Figure 2:
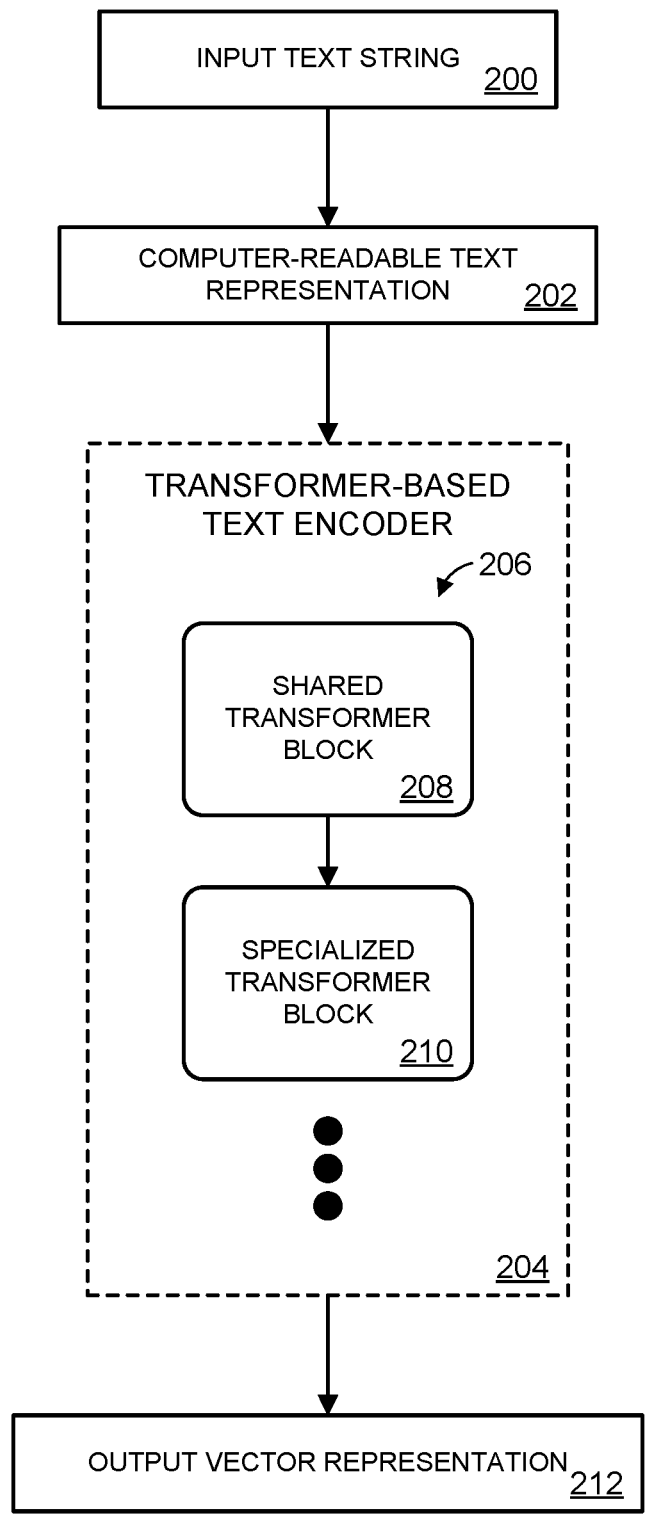
FIG. 2 schematically illustrates use of a transformer-based text encoder to encode an input text string as an output vector representation.

FIG. 2 schematically illustrates operation of a transformer-based text encoder in more detail. Specifically, FIG. 2 schematically shows an input text string 200, which generically represents both input text questions and input text passages. The input text string takes the form of any suitable sequence of text characters, including any or all of letters, numbers, spaces, punctuation, etc.

Before it is supplied to the transformer-based text encoder, the input text string is converted into a computer-readable text representation 202. As one non-limiting example, a computer-readable text representation takes the form of an input vector representation generated by tokenizing an input text string into a plurality of input tokens, where each token represents a different character or sequence of characters of the input text string. Values corresponding to each input token are then embedded into a vector representing the input text string, and this input vector representation is passed to the transformer-based text encoder for encoding as an output vector representation. In this manner, an input text question can be converted into a computer-readable question representation, and an input text passage can be converted into a computer-readable passage representation. It will be understood that, in other examples, the computer-readable text representations take other suitable forms.

Continuing with FIG. 2, computer-readable text representation 202 is input to a transformer-based text encoder 204. The transformer-based text encoder includes a plurality of transformer blocks 206 previously-trained to apply encoding operations to computer-readable text representations. The plurality of transformer blocks of the transformer-based text encoder include at least a shared transformer block 208 and a specialized transformer block 210. The shared transformer block is trained for both the computer-readable question representations and the computer-readable passage representations. The specialized transformer block includes two or more different input-specific subnetworks—e.g., one question-specific subnetwork and one passage-specific subnetwork. More specific details regarding the shared and specialized transformer blocks will be given below.

In general, a transformer-based text encoder as described herein is built up with a plurality of transformer blocks. In some embodiments, each transformer block includes a multi-head self-attention (MHA) sub-layer and at least one feed-forward network (FFN) sub-layer, with residual connections and layer-normalization applied to both sub-layers. Given an input vector $h \in \mathbb{R}^d$, the FFN sub-layer produces an output vector as follows:

$$FFN(h) = W_v \max\{0, W_1 h + b_1\} + b_2$$

where $W_1 \in \mathbb{R}^{m \times d}$, $W_2 \in \mathbb{R}^{d \times m}$, $b_1 \in \mathbb{R}^m$, $b_2 \in \mathbb{R}^d$ are learnable parameters. For a sequence of N tokens, each transformer block produces N corresponding vectors, together with a vector for the special prefix token [CLS], which is useable as the representation of the sequence. In other embodiments, the transformer blocks are implemented in other suitable ways. Non-limiting examples of suitable machine learning (ML) and/or artificial intelligence (AI) techniques useable to implement transformer blocks will be described below with respect to FIG. 10.

After encoding operations are applied by the transformer blocks, the transformer-based text encoder outputs an encoded version of the input text string as an output vector representation 212. As will be described in more detail below, different vector representations output by the transformer-based text encoder are compared to one another—e.g., to determine which of a number of text passages are most relevant to an input text question. In some embodiments, the transformer-based text encoder encodes questions and passages into d-dimension vectors, using the final output vectors for [CLS] from the corresponding encoders, denoted as $q \in \mathbb{R}^d$ and $p \in \mathbb{R}^d$, respectively. The relevance between a question and a passage can then be measured in the vector space by calculating the dot product between the corresponding vectors:

$$sim(q,p) = qTp.$$

Figure 3:
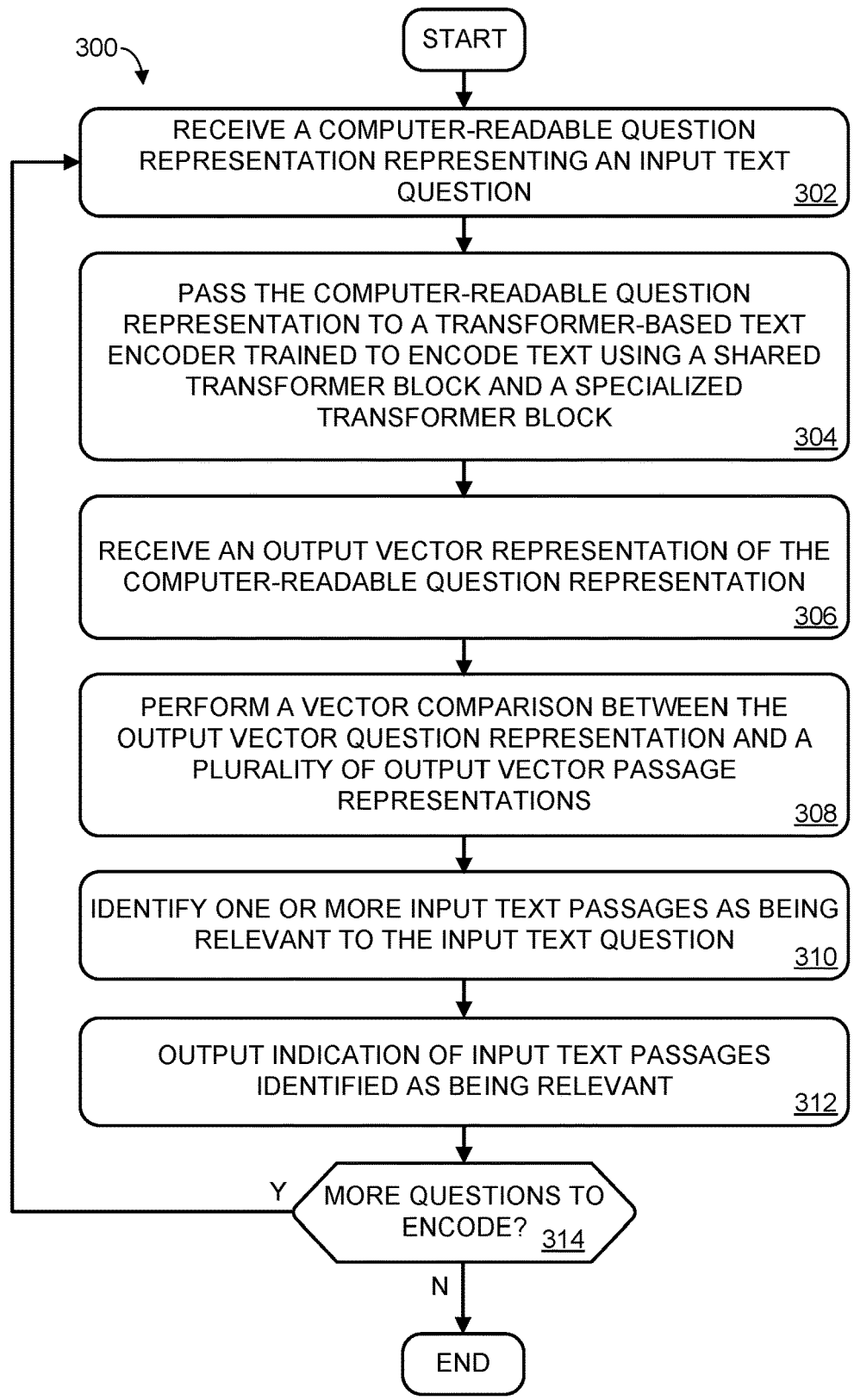
FIG. 3 illustrates an example method for computer passage retrieval.

FIG. 3 illustrates an example method 300 for computer passage retrieval. Method 300 is implemented by any suitable computing system of one or more computing devices. Any computing device(s) implementing method 300 can have any suitable capabilities, hardware configuration, and form factor. In some embodiments, different steps of method 300 are performed by two or more different computing devices communicating over a computer network. As one non-limiting example, method 300 is implemented by computing system 1000 described below with respect to FIG. 10.

At 302, method 300 includes receiving a computer-readable question representation, representing an input text question. This may be done substantially as described above with respect to FIGS. 1 and 2. As one non-limiting example, a human user composes the input text question, which is then converted into an input vector representation by tokenizing the input question into a sequence of input tokens. Values representing the input tokens are then embedded into a vector representing the input question.

At 304, method 300 includes passing the computer-readable question representation to a transformer-based text encoder. The transformer-based text encoder is previously trained to encode computer-readable question representations and computer-readable passage representations using a shared transformer block and a specialized transformer block.

Figure 4A:
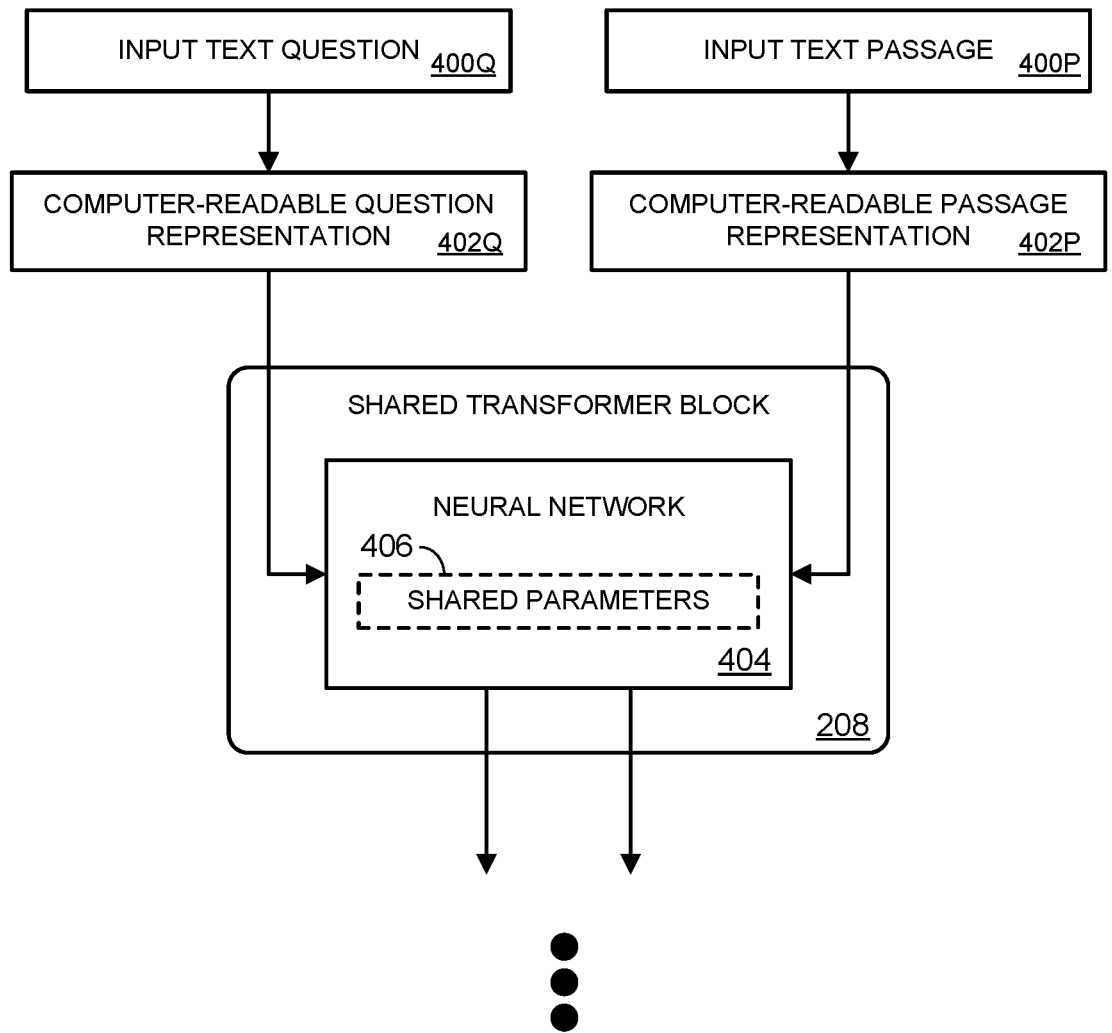
FIGS. 4A and 4B schematically illustrate text encoding using shared and specialized transformer blocks of a transformer-based text encoder.
Figure 4B:
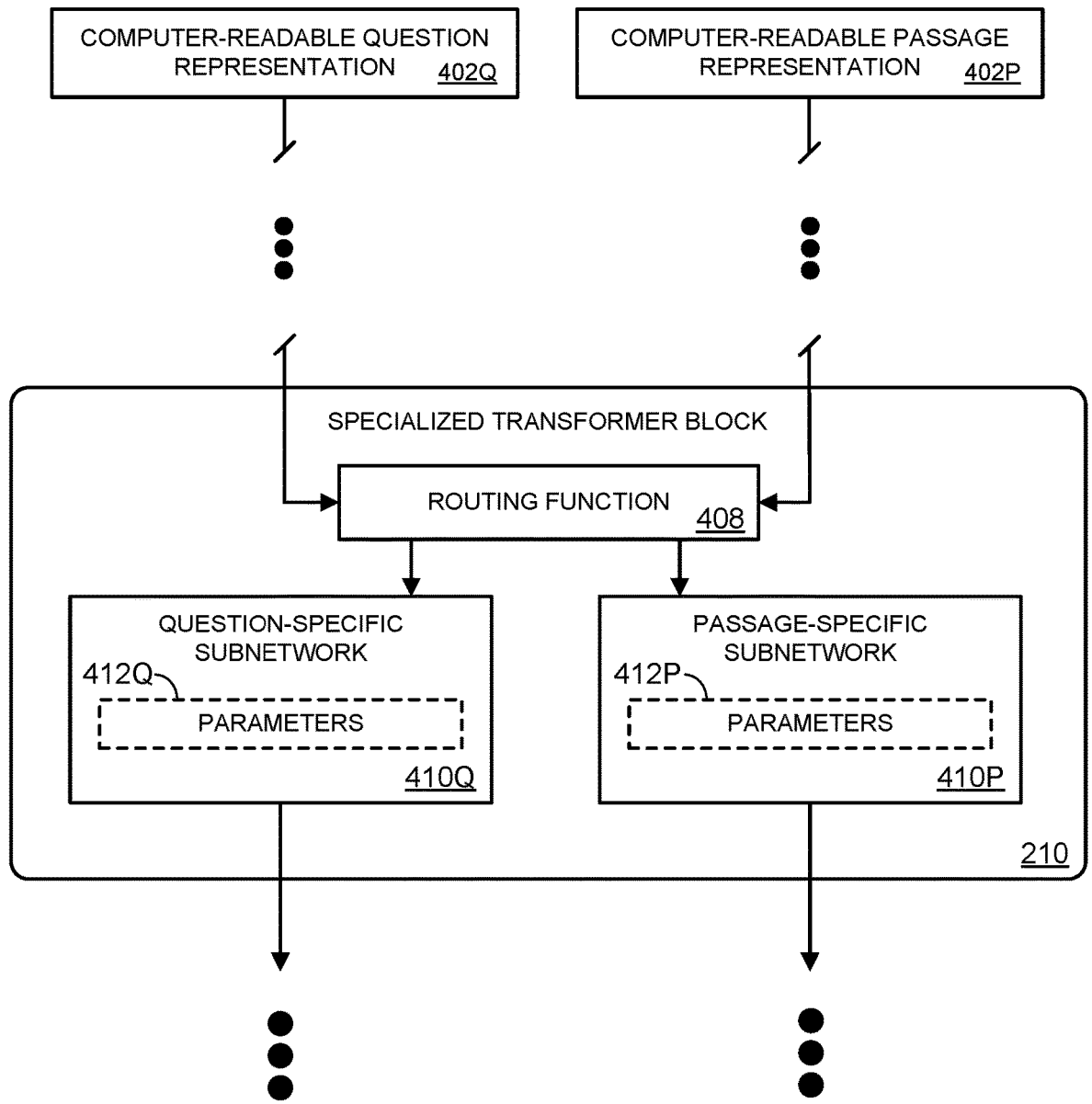

This is schematically illustrated with respect to FIGS. 4A and 4B. Specifically, FIG. 4A schematically shows an input text question 400Q converted into a computer-readable question representation 402Q, and an input text passage 400P converted into a computer-readable passage representation 402P. Both the question representation 402Q and passage representation 402P are input to shared transformer block 208 of transformer-based text encoder 204 shown in FIG. 2.

The shared transformer block is trained to perform encoding operations for both computer-readable question representations and computer-readable passage representations. In some cases, the shared transformer block is a first transformer block of the transformer-based text encoder. In other cases, the shared transformer block receives text representations that have already been at least partially encoded by one or more preceding transformer blocks of the transformer-based text encoder. Output from the shared transformer block is then passed to a next transformer block of the transformer-based text encoder, or alternately output as an output vector representation of the input text string, in cases where the shared transformer block is the last transformer block of the text encoder.

FIG. 4A is illustrated as though the computer-readable question representation and computer-readable passage representation are both provided to the shared transformer block at the same time. It will be understood, however, that this need not be the case. Rather, in some embodiments, computer-readable question representations and computer-readable passage representations are provided to the transformer-based text encoder at different times. In some cases, computer-readable question representations and computer-readable passage representations are encoded simultaneously by different instances of the transformer-based text encoder, implemented by the same or different computing devices.

In FIG. 4A, the shared transformer block performs encoding operations via a neural network 404. As one example, this takes the form of a feed-forward network (FFN). The neural network is parameterized with a shared set of parameters 406 that are used to apply encoding operations to both the computer-readable question representations and the computer-readable passage representations. This stands in contrast to the bi-encoder architecture, in which two independent sets of parameters are used for separate question encoders and passage encoders. As such, use of shared transformer blocks in the transformer-based text encoder provides the technical benefit of conserving computational resources by reducing the number of parameters used to perform text encoding and passage retrieval. Example approaches for training the shared transformer block, and thereby changing the shared set of parameters used in the neural network, will be given below with respect to FIG. 8-9B.

The transformer-based text encoder also includes a specialized transformer block used to apply encoding operations to the question representations and passage representations. This is schematically illustrated with respect to FIG. 4B, showing specialized transformer block 210 of transformer-based text encoder 204. As with the shared transformer block, the specialized transformer block in some embodiments is a first transformer block of the transformer-based text encoder. In other embodiments, the specialized transformer block receives text representations that have already been at least partially encoded by one or more preceding transformer blocks of the transformer-based text encoder—e.g., the specialized transformer block receives output from a preceding shared transformer block. Output from the specialized transformer block is then passed to a next transformer block of the transformer-based text encoder, or alternately output as an output vector representation of the input text string, in cases where the specialized transformer block is the last transformer block of the text encoder.

In general, a specialized transformer block includes two or more input-specific subnetworks, and a routing function to select an input-specific subnetwork of the two or more input-specific subnetworks for each of the computer-readable text representations. In FIG. 4B, the specialized transformer block includes a routing function 408, a question-specific subnetwork 410Q, and a passage specific subnetwork 410P. In some embodiments, the specialized transformer block can be described as using a mixture-of-experts (MOE) approach, in which multiple expert FFN sub-layers are used in parallel, and a routing function is used to choose among these expert FFN sub-layers.

To this end, the different input-specific subnetworks in some embodiments are separately parameterized to apply different encoding operations to different types of input text representations. In other words, a first input-specific subnetwork is parameterized with a first set of parameters, and a second input-specific subnetwork is parameterized with a second set of parameters, different from the first set of parameters. This provides the technical benefit of improving performance of the transformer-based text encoder on both question representations and passage representations, thereby improving human computer interaction.

The specialized transformer block includes a routing function that routes different text representations to different input-specific subnetworks. In the example of FIG. 4B, the routing function routes computer-readable question representations through the question-specific subnetwork, and routes computer-readable passage representations through a passage-specific subnetwork. In other words, the routing function is a deterministic routing function (Det-R) that automatically routes the computer-readable question representations through the question-specific subnetwork, and automatically routes the computer-readable passage representations through the passage-specific subnetwork.

In other examples, other suitable routing functions are used. As additional non-limiting examples, the routing function uses sequence-based routing (Seq-R) or token-based routing (Tok-R). In the case of Seq-R and Tok-R, the routing function is a parameterized routing function trained to route the computer-readable text representations, such that each computer-readable question representation is routed through one or more question-specific subnetworks and each computer-readable passage representation is routed through one or more passage-specific subnetworks.

Such a parametrized routing function can be expressed as:

$$R(u)=\text{GumbelSoftmax}(Au+c),$$

where GumbelSoftmax outputs a I-dimensional one-hot vector based on the linear projection parameterized by $A \in \mathbb{R}^{d \times I}$ and $c \in \mathbb{R}^{I}$, I is the number of input-specific subnetworks in the specialized transformer block, and $u \in \mathbb{R}^{d}$ is the input of the routing function. In some embodiments, the routing function is jointly learned with other network parameters of the transformer-based text encoder using discrete reparameterization.

As discussed above, in some embodiments the computer-readable text representations input to the transformer-based text encoder include a plurality of input tokens. In the case of Seq-R, routing is performed at the sequence level, and all tokens in a sequence share the same u, which is the FFN input vector $h_{[cls]}$ representing the special prefix token [CLS]. In other words, each computer-readable text representation comprises a sequence of tokens, and every token of a given computer-readable text representation is routed through a same input-specific subnetwork of the two or more input-specific subnetworks via a pre-trained and parameterized routing process.

By contrast, in the case of Tok-R, the routing function independently routes each token—e.g., for the j-th token in the sequence, u is set to the corresponding FFN input vector $h_j$. In other words, each computer-readable text representation comprises a sequence of tokens, and the routing function routes two or more different tokens of a given computer-readable text representation through different input-specific subnetworks of the two or more input-specific subnetworks.

Figure 5:
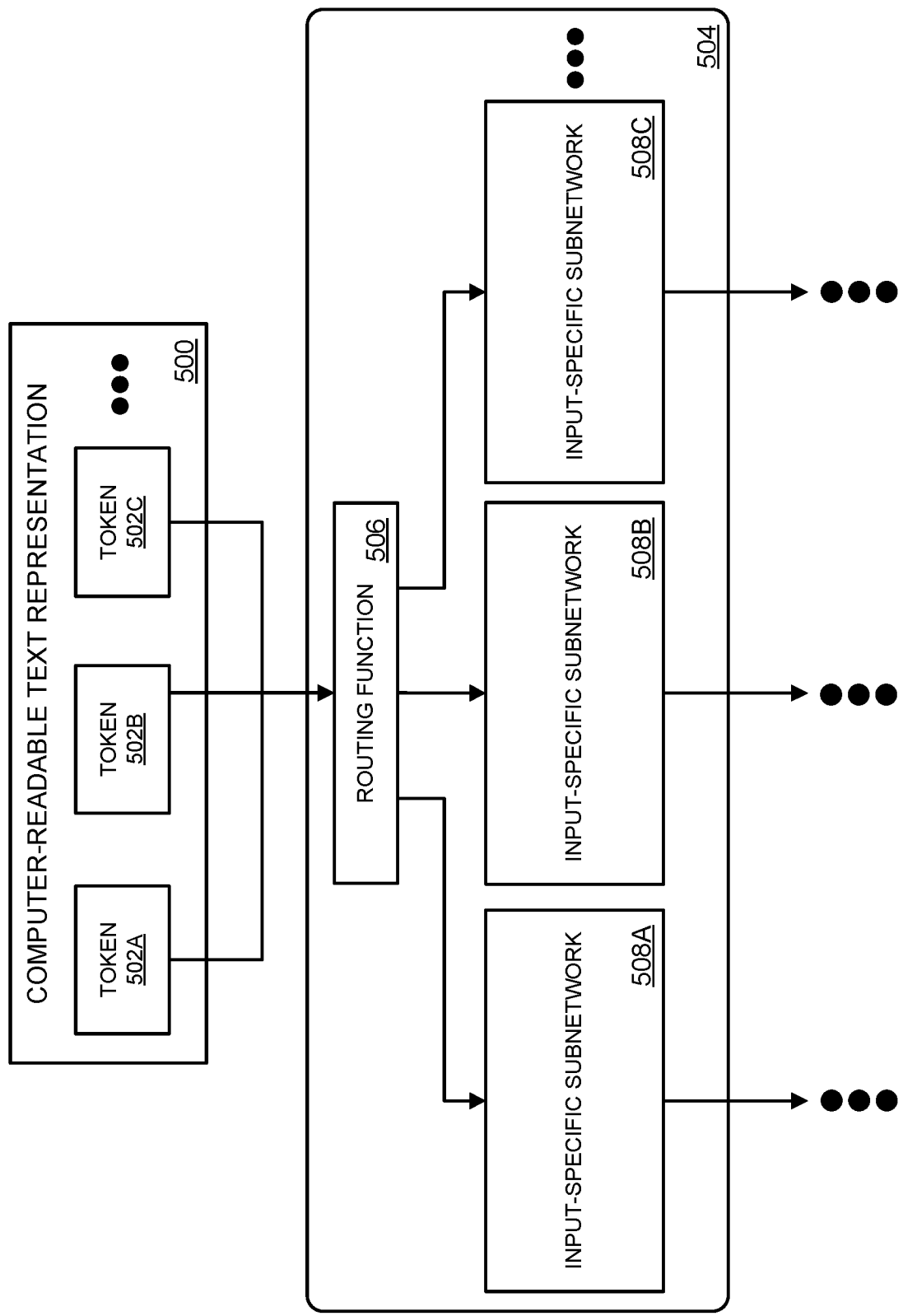
FIG. 5 schematically illustrates routing of different tokens of an input text representation to different input-specific subnetworks of a specialized transformer block.

This scenario is schematically illustrated with respect to FIG. 5, showing an example computer-readable text representation 500. Representation 500 includes a sequence of tokens 502A-502C. As discussed above, in some embodiments, a computer-readable text representation is generated by applying a tokenization process to an input text string, which converts individual characters or strings of characters of the input text into a sequence of token representations. Values representing the tokens can then be embedded into an input vector representation.

Computer-readable text representation 500 is input to a specialized transformer block 504, which is one of a plurality of different transformer blocks of a transformer-based text encoder. A routing function 506 of the specialized transformer block routes tokens of the computer-readable text representation between different input-specific subnetworks 508A-508C of the specialized transformer block. In this example, the routing function uses Tok-R routing, in which different tokens of the same text representation are routed to different subnetworks of the specialized transformer block. For instance, token 502A is routed to subnetwork 508A, while tokens 508B and 508C are routed to subnetworks 508B and 508C. This provides the technical benefit of improving the performance of the transformer-based text encoder, as the output vector representation ultimately generated for the input text string will more accurately capture relationships and contexts between different input characters and words of the input text string.

As discussed above, the present disclosure primarily describes the transformer-based text encoder as having one shared transformer block and one specialized transformer block. It will be understood that this is only done for the sake of simplicity. Rather, in some embodiments, the "shared transformer block" described herein is one of two or more shared transformer blocks of the transformer-based text encoder, and the "specialized transformer block" is one of two or more specialized transformer blocks of the transformer-based text encoder. More particularly, in some embodiments, the two or more shared transformer blocks are interleaved with the two or more specialized transformer blocks.

Figure 6:
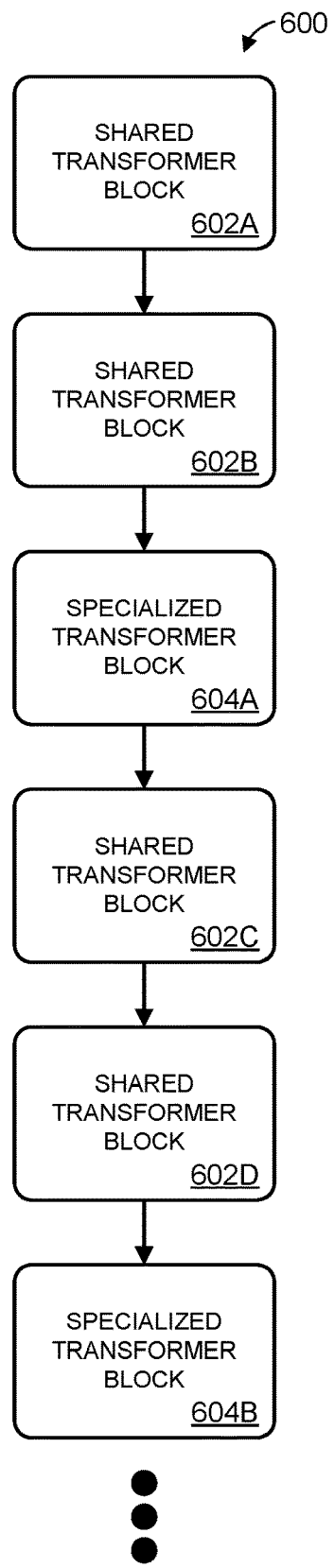
FIG. 6 schematically illustrates an example transformer-based text encoder including shared transformer blocks interleaved with specialized transformer blocks.

Such a scenario is schematically illustrated with respect to FIG. 6, showing another example transformer-based text encoder 600. Transformer-based text encoder 600 includes at least four shared transformer blocks 602A-602D, and at least two specialized transformer blocks 604A and 604B. Furthermore, the shared and specialized transformer blocks are interleaved, such that the output of shared transformer block 602B passes to specialized transformer block 604A, and the output of specialized transformer block 604A passes to shared transformer block 602C, and so on. Such an interleaving arrangement provides a technical benefit of improving human-computer interaction by improving the encoding and passage retrieval performance of the transformer-based text encoder.

In the example of FIG. 6, the transformer blocks have a ratio of two shared transformer blocks for every one specialized transformer block. In other examples, other suitable ratios are used. Furthermore, in other examples, block interleaving need not be used. Rather, for instance, another example scenario uses a group of two or more shared transformer blocks, followed by a group of two or more specialized transformer blocks, before the transformer-based text encoder outputs a vector representation of the input text string.

Returning briefly to FIG. 3, at 306, method 300 includes receiving an output vector representation of the computer-readable question representation. As discussed above, in some embodiments the transformer-based text encoder encodes questions and passages into d-dimension vectors, using the final output vectors for [CLS] from the corresponding encoders, denoted as $q \in \mathbb{R}^{d}$ and $p \in \mathbb{R}^{d}$, respectively. In other embodiments, the vector representations output by the transformer-based text encoder take other suitable forms.

Continuing with FIG. 3, at 308, method 300 includes performing a vector comparison between the output vector question representation and a plurality of output vector passage representations. This enables the computing system to evaluate the relevance between the input text question and a plurality of input text passages also encoded via the transformer-based text encoder. As one non-limiting example, an output vector question representation and an output vector passage representation are compared in the vector space by calculating the dot products between the corresponding vectors. More generally, in some embodiments, performing the vector comparison includes calculating relevance scores between the output vector question representation and a plurality of output vector passage representations, with a dot product being one suitable example of a relevance score.

At 310, method 300 includes identifying one or more input text passages as being relevant to the input text question. As one example, this includes identifying one text passage having a highest relevance score to the input text question—e.g., identifying an output vector passage representation having the largest dot product with the output vector question representation. Additionally, or alternatively, it is possible in some scenarios that none of the encoded text passages are relevant to the input text question. Thus, in some examples, the one or more input text passages identified as being relevant to the input text question are associated with output vector passage representations having relevance scores higher than a threshold score. In cases where none of the output vector passage representations have relevance scores higher than the threshold score, then no input text passages are identified as being relevant to the input text question. In various examples, any suitable relevance score threshold is used, depending on the specific manner in which relevance scores are calculated, and depending on the desired degree of confidence that an identified text passage is actually relevant to the input text question.

Figure 7:
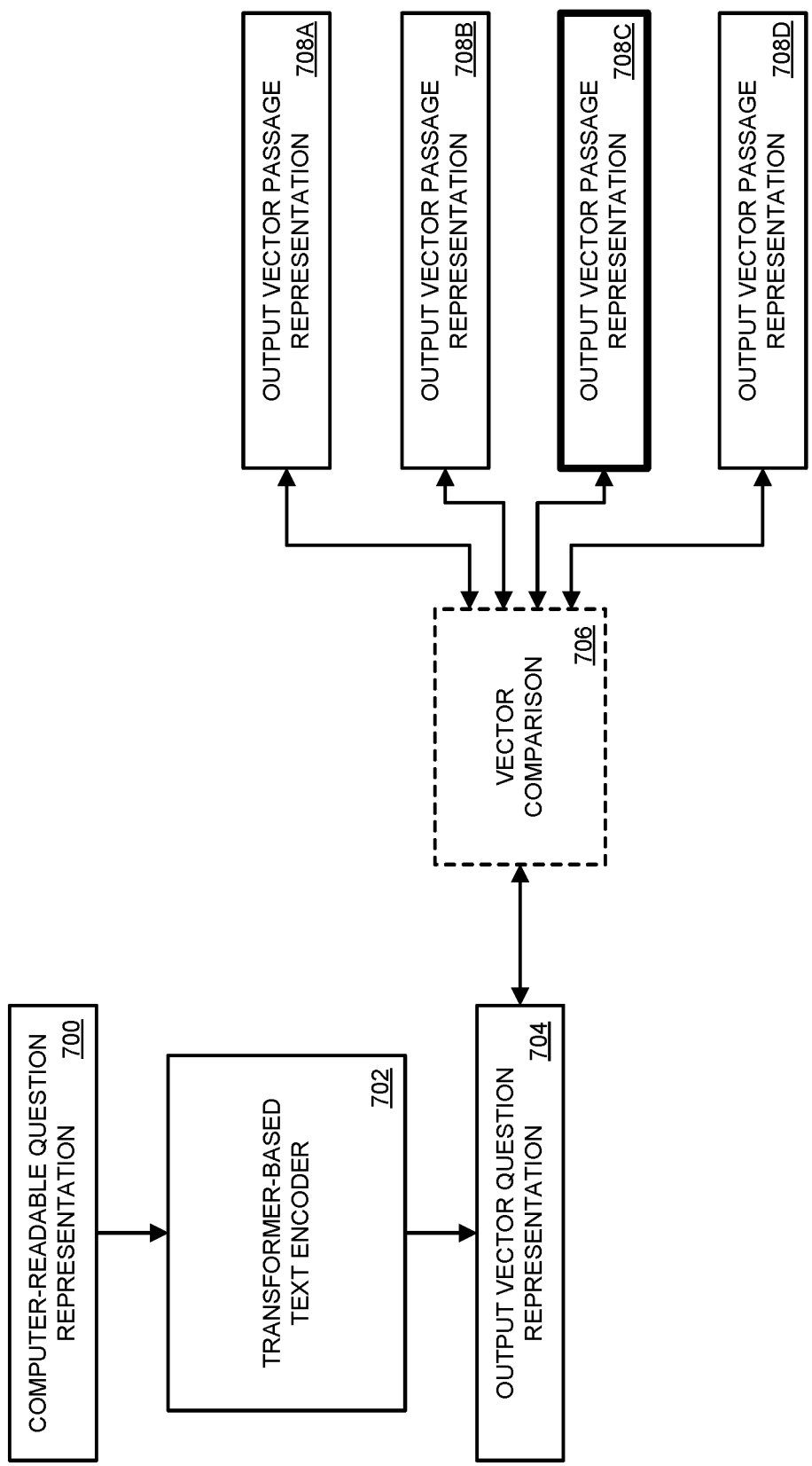
FIG. 7 schematically illustrates performing a vector comparison between an output vector question representation and a plurality of output vector passage representations.

This process is schematically illustrated with respect to FIG. 7, schematically showing an example computer-readable question representation 700. Representation 700 is input to a transformer-based text encoder 702, which encodes the question representation as an output vector question representation 704 as described above. The computing system then performs a vector comparison 706 between the output vector question representation and a plurality of output vector passage representations 708A-D, which correspond to input text passages previously encoded by the transformer-based text encoder. As a result of the vector comparison, output vector passage representation 706C is identified as being relevant to the input text question based on a relevance score calculated via the vector comparison (e.g., a largest dot product).

Returning briefly to FIG. 3, at 312, method 300 includes outputting an indication of the one or more input text passages identified as being relevant to the input text question. Such an indication takes any suitable form, depending on the implementation. In one example, the indication specifies a unique identifier or address (e.g., filesystem address, network address) of a text passage identified as being relevant to the question. As another example, the indication includes a copy or recreation of at least a portion of the text passage identified as being relevant—e.g., the entire text passage is presented for viewing, or only a portion of the text passage that provides information relevant to the input text question.

At 314, method 300 includes determining whether there are additional input text questions for encoding via the transformer-based text encoder. If yes, method 300 returns to step 302 for encoding the next input text question. If no, method 300 ends until another input text question is provided for encoding.

The present disclosure has thus far focused on runtime use of the transformer-based text encoder. However, prior to such runtime use, the encoder is first trained on input training examples. Over the series of training passes, network parameters of the transformer-based text encoder are changed to improve the encoder's performance. In some embodiments, the transformer-based text encoder is trained using a set of training text questions, and a set of training text passages each including information corresponding to the training text questions, such that each training text question is associated with one or more training text passages. In some embodiments, the transformer-based text encoder is further trained using a set of negative training text passages, such that each training text question is associated with one or more negative training text passages including information irrelevant to the training text question.

Figure 8:
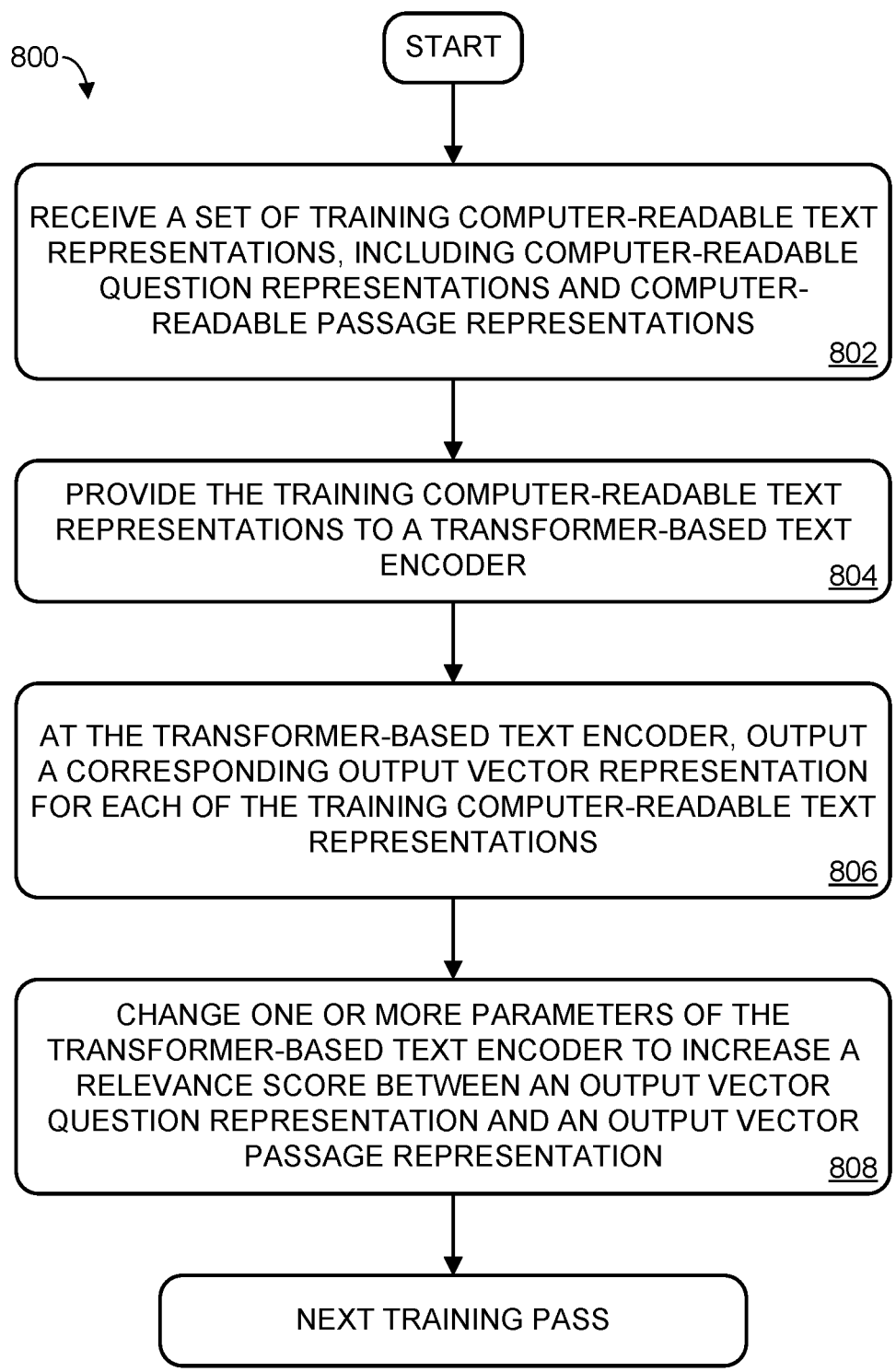
FIG. 8 illustrates an example method for training a transformer-based text encoder.

FIG. 8 illustrates an example method 800 for training a transformer-based text encoder to encode input text questions and input text passages. As with method 300, method 800 is implemented via any suitable computing system of one or more computing devices. Any computing device(s) implementing method 800 can have any suitable capabilities, hardware configuration, and form factor. In some embodiments, different steps of method 800 are performed by two or more different computing devices communicating over a computer network. As one non-limiting example, method 800 is implemented by computing system 1000 described below with respect to FIG. 10.

At 802, method 800 includes receiving a set of training computer-readable text representations representing training text strings. These include training computer-readable question representations representing training text questions, and training computer-readable passage representations representing training text passages. Notably, in this case, the training text passages are known to include information corresponding to the training text questions, such that each training text question is associated with one or more training text passages. As such, the performance of the transformer-based text encoder can be assessed during training by comparing the output vector representations corresponding to an input text question, and an input passage question known to include information relevant to the input text question.

At 804, method 800 includes, over a series of training passes, providing the training computer-readable text representations to a transformer-based text encoder. At 806, method 800 includes, at the transformer-based text encoder, outputting a corresponding output vector representation for each of the training computer-readable text representations. The transformer-based text encoder is implemented substantially as described above, with the exception that the encoder is still being trained, and thus its performance may not yet be sufficient for practical use. As such, the transformer-based text encoder includes a plurality of transformer blocks to collectively encode the training computer-readable text representations as output vector representations, such that the training text questions are encoded as output vector question representations and the training text passages are encoded as output vector passage representations.

The plurality of transformer blocks include a shared transformer block and a specialized transformer block as described above. More particularly, the shared transformer block is used to apply encoding operations to both the training text questions and the training text passages. The specialized transformer block includes two or more input-specific subnetworks, and a routing function to select an input-specific subnetwork of the two or more input-specific subnetworks for each of the training computer-readable text representations.

Figure 9A:
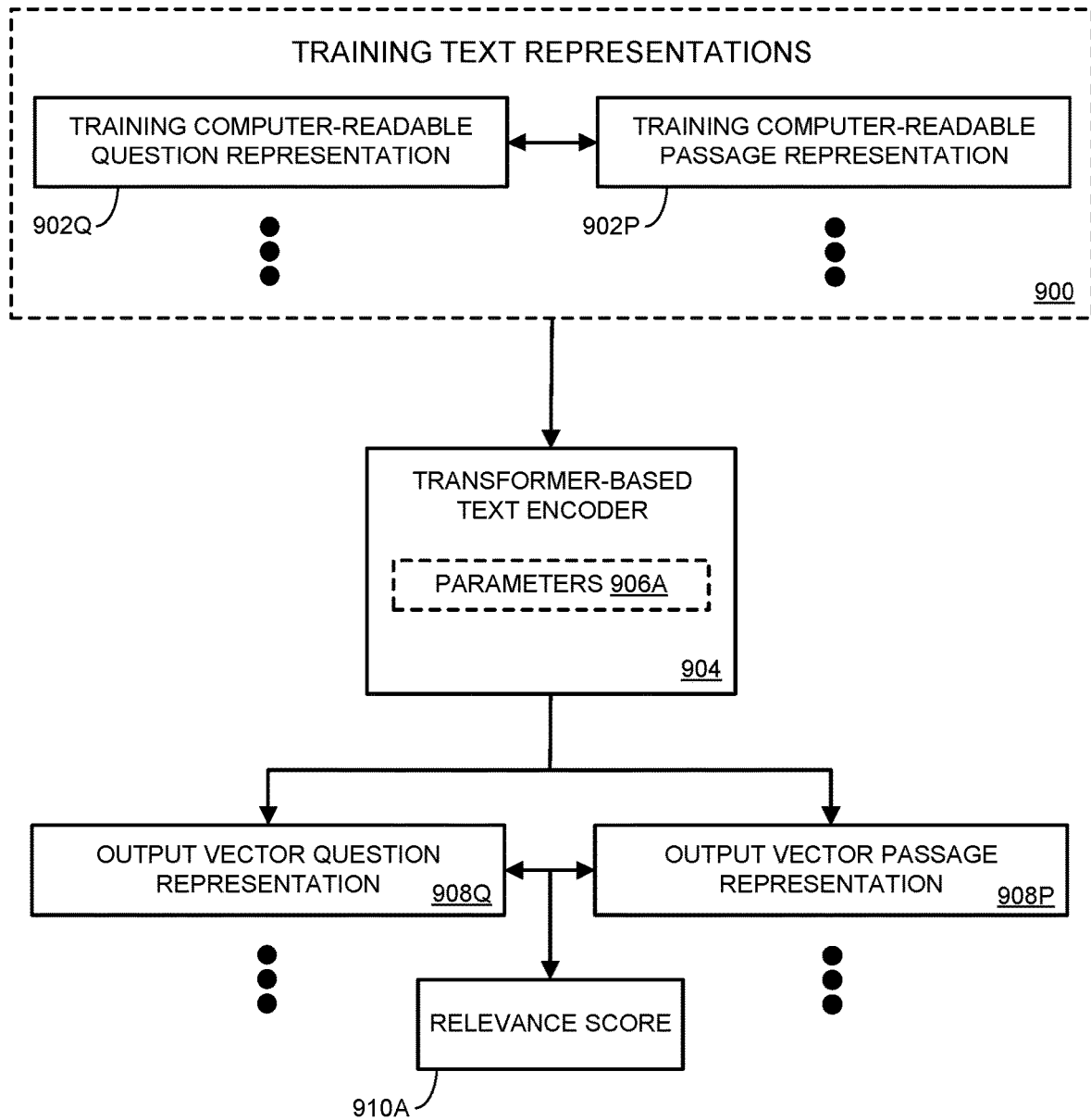
FIGS. 9A and 9B schematically illustrate updating parameters of a transformer-based text encoder during different training passes.
Figure 9B:
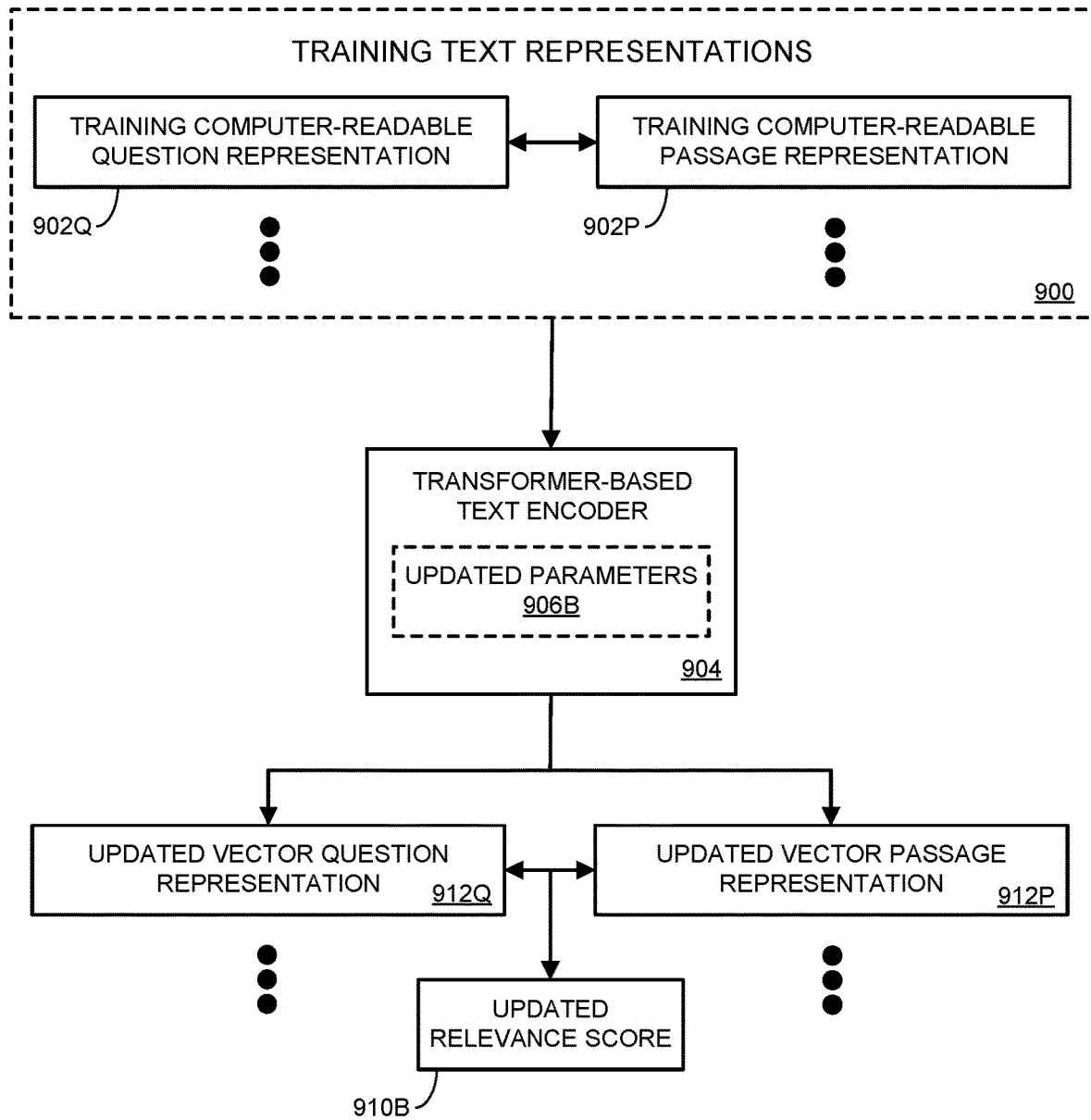

This is schematically illustrated with respect to FIGS. 9A and 9B. Specifically, FIG. 9A illustrates training of a transformer-based text encoder during one training phase of a series of training phases. In FIG. 9A, a set of training text representations 900 includes a training computer-readable question representation 902Q and a training computer-readable passage representation 902P. As discussed above, these represent corresponding input text questions and input passage representations. In this case, however, the training passage is known to include information relevant to the training question. In some cases, the training question is also paired with one or more negative passage examples that are irrelevant to the training question. It will be understood that the set of training text representations can include any suitable number of different training question representations, each associated with any suitable number of different training passage representations.

The training text representations are input to a transformer-based text encoder 904. In FIG. 9A, the transformer-based text encoder is parameterized by an initial set of network parameters 906A. These generically represent any or all parameters of different transformer blocks of the transformer-based text encoder—e.g., parameters used for different shared transformer blocks, parameters used for different input-specific subnetworks of specialized transformer blocks, and parameters used for routing functions of the specialized transformer blocks in cases where Seq-R or Tok-R routing functions are used.

The transformer-based text encoder outputs a vector question representation 908Q and a vector passage representation 908P corresponding to the input training question and passage representations 902Q and 902P. The computing system then calculates a relevance score 910A between the vector question representation and the vector passage representation. As discussed above, the relevance score serves as an indicator of the performance of the encoder during training, as the training text passage is known to include information relevant to the input text passage.

Returning briefly to FIG. 8, at 808, method 800 includes, prior to a next training pass of the series of training passes, changing one or more parameters of the transformer-based text encoder. This is done to increase a relevance score between an output vector question representation corresponding to a training text question (e.g., vector representation 908Q), and an output vector passage representation corresponding to a training text passage associated with the training text question (e.g., vector representation 908P), as compared to a previous training pass of the series of training passes.

This is schematically illustrated in FIG. 9B, again showing the training text representation 900 provided to the transformer-based text encoder 904. However, FIG. 9B represents a later training pass of the series of training passes as compared to FIG. 9A. Between the scenarios depicted in FIGS. 9A and 9B, parameters of the transformer-based text encoder have been updated to an updated set of parameters 906B. This affects performance of the transformer-based text encoder, causing the encoder to output an updated vector question representation 912Q and updated vector passage representation 912P. These are compared to give an updated relevance score 910B, which is higher than relevance score 910A.

The specific training procedure used to change the parameters of the transformer-based text encoder varies depending on the implementation. In various embodiments, single-set or multi-set training procedures are used. In single-set training, the transformer-based text encoder is trained using only a single dataset, and is then evaluated on the same dataset. This provides the technical benefit of faster and more efficient training of the transformer-based text encoder, particularly when the encoder is intended for runtime use in a relatively specific domain captured by the dataset. However, single-set training can negatively affect performance of the encoder on other datasets for which it was not trained. By contrast, in multi-set training, the encoder is trained by combining training data from multiple datasets. This provides the technical benefit of improving performance of the encoder across a wider range of question and passage domains.

In some embodiments, during training, the transformer-based text encoder is optimized based on a contrastive learning objective:

$$L_{sim} = \frac{\exp(sim(q, p^+))}{\sum_{p' \in \rho \cup \{p^-\}} \exp(sim(q, p'))}$$

where $p^+$ is the relevant (positive) passage for the given input question, and $p^-$ is the set of irrelevant (negative) passages. All passages are pre-converted into vectors using the passage encoder. Then, each incoming question is encoded using the text encoder, and a top-K list of most relevant passages are retrieved based on their relevance scores with respect to the question.

In such cases, $L_{sim}$ uses a set of negative passages $p^-$ for each question. There are several ways to construct $p^-$. As one non-limiting example, two negative passages are used per question: one is the top passage retrieved by BM25 that does not include the answer to the question, and the other is chosen from the gold positive passages for other questions in the same mini-batch.

It has been shown that mining harder negative examples with iterative training can lead to better performance. As such, in some embodiments, the transformer-based text encoder is trained using hard negatives mining. Specifically, the encoder is trained with a first set of negative passages $p_1^-$, generated as described above. Then, a second set of negative passages $p_2^-$ is generated by retrieving the top-100 ranked passages (or another suitable number of top ranked passages) for each question, excluding the gold passage. In single-set training scenarios, $p_1^-$ and $p_2^-$ are combined to train the encoder. In multi-set training scenarios, only $p_2^-$ is used to train the encoder, which provides the technical benefit of improving training efficiency.

As discussed above, the routing function used by the specialized transformer block of the transformer-based text encoder in some cases is a trained parameterized routing function. In some embodiments, such a parameterized routing function is trained using the contrastive learning objective $L_{sim}$ described above. In the case of Seq-R and Tok-R routing functions, to avoid routing all inputs to the same expert FFN sub-layer, entropic regularization is applied. In other words, training the routing function includes using entropic regularization to vary which input-specific subnetwork of the two or more input-specific subnetworks is selected for each of a plurality of training computer-readable text representations input to the transformer-based text encoder over a series of training passes.

This can be done by calculating $L_{ent}$ as follows:

$$L_{ent} = -\sum_{i=1}^{I} P(i) \log P(i)$$

where $P(i) = \text{Softmax}(Ah+c)_i$ is the probability of the i-th expert FFN sub-layer being selected. Hence, the joint training objective is:

$$L_{joint} = L_{sim} + \beta L_{ent}$$

where $\beta$ is a scalar hyperparameter. As one non-limiting example, $\beta = 0.01$.

It will be understood that the training procedures described above are non-limiting examples. Other examples of suitable training procedures are described below with respect to FIG. 10.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
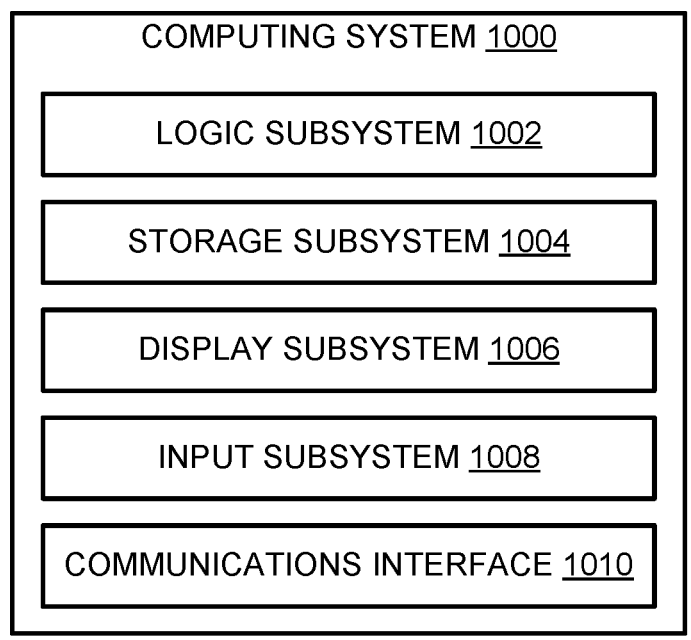
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computing system comprises: a logic subsystem; and a storage subsystem holding instructions executable by the logic subsystem to implement a transformer-based text encoder, the transformer-based text encoder comprising: a plurality of transformer blocks previously-trained to apply encoding operations to computer-readable text representations of input text strings, the computer-readable text representations including computer-readable question representations of input text questions, and computer-readable passage representations of input text passages, the plurality of transformer blocks comprising: a shared transformer block trained for both the computer-readable question representations and the computer-readable passage representations; and a specialized transformer block including two or more input-specific subnetworks, and a routing function to select an input-specific subnetwork of the two or more input-specific subnetworks for each of the computer-readable text representations. In this example or any other example, the two or more input-specific subnetworks include a question-specific subnetwork and a passage-specific subnetwork, and the routing function is a deterministic routing function that automatically routes the computer-readable question representations through the question-specific subnetwork, and automatically routes the computer-readable passage representations through the passage-specific subnetwork. In this example or any other example, the routing function is a parameterized routing function trained to route the computer-readable text representations, such that each computer-readable question representation is routed through one or more question-specific subnetworks and each computer-readable passage representation is routed through one or more passage-specific subnetworks. In this example or any other example, training the routing function includes using entropic regularization to vary which input-specific subnetwork of the two or more input-specific subnetworks is selected for each of a plurality of training computer-readable text representations input to the transformer-based text encoder over a series of training passes. In this example or any other example, each computer-readable text representation comprises a sequence of tokens, and every token of a given computer-readable text representation is routed through a same input-specific subnetwork of the two or more input-specific subnetworks. In this example or any other example, each computer-readable text representation comprises a sequence of tokens, and the routing function routes two or more different tokens of a given computer-readable text representation through different input-specific subnetworks of the two or more input-specific subnetworks. In this example or any other example, the shared transformer block includes a neural network parameterized with a shared set of parameters that are used to apply encoding operations to both the computer-readable question representations and the computer-readable passage representations. In this example or any other example, a first input-specific subnetwork of the two or more input-specific subnetworks is parameterized with a first set of parameters, and a second input-specific subnetwork of the two or more input-specific subnetworks is parameterized with a second set of parameters, different from the first set of parameters. In this example or any other example, the shared transformer block is one of two or more shared transformer blocks of the transformer-based text encoder, and the specialized transformer block is one of two or more specialized transformer blocks of the transformer-based text encoder, and wherein the two or more shared transformer blocks are interleaved with the two or more specialized transformer blocks. In this example or any other example, the plurality of transformer blocks of the transformer-based text encoder has a ratio of two shared transformer blocks for every one specialized transformer block. In this example or any other example, the transformer-based text encoder is trained using a set of training text questions, and a set of training text passages each including information corresponding to the training text questions, such that each training text question is associated with one or more training text passages. In this example or any other example, the transformer-based text encoder is further trained using a set of negative training text passages, such that each training text question is associated with one or more negative training text passages including information irrelevant to the training text question. In this example or any other example, the computer-readable text representations are input vector representations generated by tokenizing each input text string into input tokens, and embedding values for each input token into a vector representing the input text string.

In an example, a method for computer passage retrieval comprises: receiving a computer-readable question representation of an input text question; passing the computer-readable question representation to a transformer-based text encoder, the transformer-based text encoder previously trained to encode computer-readable question representations and computer-readable passage representations using a shared transformer block and a specialized transformer block, wherein the shared transformer block is trained for both computer-readable question representations and computer-readable passage representations, and the specialized transformer block includes a routing function that routes computer-readable question representations through a question-specific subnetwork and routes computer-readable question representations through a passage-specific subnetwork; receiving, as an output of the transformer-based text encoder, an output vector question representation of the computer-readable question representation; performing a vector comparison between the output vector question representation and a plurality of output vector passage representations corresponding to a plurality of different previously-encoded input text passages; based at least in part on the vector comparison, identifying one or more of the input text passages as being relevant to the input text question; and outputting an indication of the one or more input text passages identified as being relevant to the input text question. In this example or any other example, the routing function is a deterministic routing function that automatically routes the computer-readable question representations through the question-specific subnetwork, and automatically routes the computer-readable passage representations through the passage-specific subnetwork. In this example or any other example, the routing function is a parameterized routing function trained to route computer-readable question representations through the question-specific subnetwork, and route computer-readable passage representations through the passage-specific subnetwork. In this example or any other example, the shared transformer block includes a neural network parameterized with a shared set of parameters that are used to apply encoding operations to both the computer-readable question representations and the computer-readable passage representations. In this example or any other example, the shared transformer block is one of two or more shared transformer blocks of the transformer-based text encoder, and the specialized transformer block is one of two or more specialized transformer blocks of the transformer-based text encoder, and wherein the two or more shared transformer blocks are interleaved with the two or more specialized transformer blocks. In this example or any other example, performing the vector comparison includes calculating relevance scores between the output vector question representation and the plurality of output vector passage representations, and wherein the one or more input text passages identified as being relevant to the input text question are associated with output vector passage representations having relevance scores higher than a threshold score.

In an example, a method for training a transformer-based text encoder implemented by a computing system comprises: receiving a set of training computer-readable text representations of training text strings, the training computer-readable text representations including training computer-readable question representations of training text questions, and training computer-readable passage representations of training text passages, and the training text passages each including information corresponding to the training text questions, such that each training text question is associated with one or more training text passages; over a series of training passes, providing the training computer-readable text representations to a transformer-based text encoder; at the transformer-based text encoder, providing as output a corresponding output vector representation for each of the training computer-readable text representations, the transformer-based text encoder comprising a plurality of transformer blocks to collectively encode the training computer-readable text representations as the output vector representations, such that the training text questions are encoded as output vector question representations and the training text passages are encoded as output vector passage representations, the plurality of transformer blocks including: a shared transformer block to apply encoding operations to both the training text questions and the training text passages; and a specialized transformer block including two or more input-specific subnetworks, and a routing function to select an input-specific subnetwork of the two or more input-specific subnetworks for each of the training computer-readable text representations; and prior to a next training pass of the series of training passes, changing one or more parameters of the transformer-based text encoder to increase a relevance score between an output vector question representation corresponding to a training text question, and an output vector passage representation corresponding to a training text passage associated with the training text question, as compared to a previous training pass of the series of training passes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
    a logic subsystem; and
    a storage subsystem holding instructions executable by the logic subsystem to implement a transformer-based text encoder, the transformer-based text encoder comprising:
        a plurality of transformer blocks previously-trained to apply encoding operations in series to computer-readable text representations of input text strings, the computer-readable text representations including computer-readable question representations of input text questions, and computer-readable passage representations of input text passages, the plurality of transformer blocks comprising:

a shared transformer block trained for both the computer-readable question representations and the computer-readable passage representations; and a specialized transformer block configured to receive a first encoded output from the shared transformer block and generate a second encoded output, the specialized transformer block implementing a mixture of experts (MoE) architecture in which multiple expert feed-forward network (FFN) sub-layers are used in parallel, including two or more input-specific subnetworks to apply different encoding operations to different types of computer-readable text representations, and a routing function to select one or more input-specific subnetworks of the two or more input-specific subnetworks for each of the computer-readable text representations, wherein each computer-readable question representation is routed through one or more question-specific subnetworks and each computer-readable passage representation is routed through one or more passage-specific subnetworks.

2. The computing system of claim 1, wherein the routing function is a deterministic routing function that automatically routes the computer-readable question representations through the one or more question-specific subnetworks, and automatically routes the computer-readable passage representations through the one or more passage-specific subnetworks.

3. The computing system of claim 1, wherein the routing function is a parameterized routing function trained to compute routing probabilities based on the computer-readable text representations.

4. The computing system of claim 3, wherein training the routing function includes using entropic regularization to vary which input-specific subnetwork of the two or more input-specific subnetworks is selected for each of a plurality of training computer-readable text representations input to the transformer-based text encoder over a series of training passes.

5. The computing system of claim 3, wherein each computer-readable text representation comprises a sequence of tokens, and every token of a given computer-readable text representation is routed through a same input-specific subnetwork of the two or more input-specific subnetworks.

6. The computing system of claim 3, wherein each computer-readable text representation comprises a sequence of tokens, and the routing function routes two or more different tokens of a given computer-readable text representation through different input-specific subnetworks of the two or more input-specific subnetworks.

7. The computing system of claim 1, wherein the shared transformer block includes a neural network parameterized with a shared set of parameters that are used to apply encoding operations to both the computer-readable question representations and the computer-readable passage representations.

8. The computing system of claim 1, wherein a first input-specific subnetwork of the two or more input-specific subnetworks is parameterized with a first set of parameters, and a second input-specific subnetwork of the two or more input-specific subnetworks is parameterized with a second set of parameters, different from the first set of parameters.

9. The computing system of claim 1, wherein the shared transformer block is one of two or more shared transformer blocks of the transformer-based text encoder, and the specialized transformer block is one of two or more specialized transformer blocks of the transformer-based text encoder, and wherein the two or more shared transformer blocks are interleaved with the two or more specialized transformer blocks.

10. The computing system of claim 9, wherein the plurality of transformer blocks of the transformer-based text encoder has a ratio of two shared transformer blocks for every one specialized transformer block.

11. The computing system of claim 1, wherein the transformer-based text encoder is trained using a set of training text questions, and a set of training text passages each including information corresponding to the training text questions, such that each training text question is associated with one or more training text passages.

12. The computing system of claim 11, wherein the transformer-based text encoder is further trained using a set of negative training text passages, such that each training text question is associated with one or more negative training text passages including information irrelevant to the training text question.

13. The computing system of claim 1, wherein the computer-readable text representations are input vector representations generated by tokenizing each input text string into input tokens, and embedding values for each input token into a vector representing the input text string.

14. A method for computer passage retrieval, the method comprising:

receiving a computer-readable question representation of an input text question;

passing the computer-readable question representation to a transformer-based text encoder, the transformer-based text encoder previously trained to apply encoding operations to computer-readable text representations of input text strings including computer-readable question representations and computer-readable passage representations, wherein the transformer-based text encoder comprises a plurality of transformer blocks that apply the encoding operations in series, the plurality of transformer blocks including a shared transformer block and a specialized transformer block, wherein the shared transformer block is trained for both computer-readable question representations and computer-readable passage representations, and the specialized transformer block is configured to receive a first encoded output from the shared transformer block and generate a second encoded output, the specialized transformer block implementing a mixture of experts (MoE) architecture in which multiple expert feed-forward network (FFN) sub-layers are used in parallel, including two or more input-specific subnetworks to apply different encoding operations to different types of computer-readable text representations, wherein the specialized transformer block includes a routing function that routes computer-readable question representations through one or more question-specific subnetworks and routes computer-readable passage representations through one or more passage-specific subnetworks;

receiving, as an output of the transformer-based text encoder, an output vector question representation of the computer-readable question representation;

performing a vector comparison between the output vector question representation and a plurality of output vector passage representations corresponding to a plurality of different previously-encoded input text passages;

based at least in part on the vector comparison, identifying one or more of the input text passages as being relevant to the input text question; and outputting an indication of the one or more input text passages identified as being relevant to the input text question.

15. The method of claim 14, wherein the routing function is a deterministic routing function that automatically routes the computer-readable question representations through the one or more question-specific subnetworks, and automatically routes the computer-readable passage representations through the one or more passage-specific subnetworks.

16. The method of claim 14, wherein the routing function is a parameterized routing function trained to compute routing probabilities based on the computer-readable text representations.

17. The method of claim 14, wherein the shared transformer block includes a neural network parameterized with a shared set of parameters that are used to apply encoding operations to both the computer-readable question representations and the computer-readable passage representations.

18. The method of claim 14, wherein the shared transformer block is one of two or more shared transformer blocks of the transformer-based text encoder, and the specialized transformer block is one of two or more specialized transformer blocks of the transformer-based text encoder, and wherein the two or more shared transformer blocks are interleaved with the two or more specialized transformer blocks.

19. The method of claim 14, wherein performing the vector comparison includes calculating relevance scores between the output vector question representation and the plurality of output vector passage representations, and wherein the one or more input text passages identified as being relevant to the input text question are associated with output vector passage representations having relevance scores higher than a threshold score.

20. A method for training a transformer-based text encoder implemented by a computing system, the method comprising:

receiving a set of training computer-readable text representations of training text strings, the training computer-readable text representations including training computer-readable question representations of training text questions, and training computer-readable passage representations of training text passages, and the training text passages each including information corresponding to the training text questions, such that each training text question is associated with one or more training text passages;

over a series of training passes, providing the training computer-readable text representations to a transformer-based text encoder;

at the transformer-based text encoder, providing as output a corresponding output vector representation for each of the training computer-readable text representations, the transformer-based text encoder comprising a plurality of transformer blocks to collectively encode the training computer-readable text representations as the output vector representations by applying encoding operations in series such that the training text questions are encoded as output vector question representations and the training text passages are encoded as output vector passage representations, the plurality of transformer blocks including:

a shared transformer block to apply encoding operations to both the training text questions and the training text passages; and a specialized transformer block configured to receive a first encoded output from the shared transformer block and generate a second encoded output, the specialized transformer block implementing a mixture of experts (MoE architecture in which multiple expert feed-forward network (FFN) sub-layers are used in parallel, including two or more input-specific subnetworks to apply different encoding operations to different types of training computer-readable text representations, and a routing function to select one or more input-specific subnetworks of the two or more input-specific subnetworks for each of the training computer-readable text representations, wherein each training computer-readable question representation is routed through one or more question-specific subnetworks and each training computer-readable passage representation is routed through one or more passage-specific subnetworks; and prior to a next training pass of the series of training passes, changing one or more parameters of the transformer-based text encoder to increase a relevance score between an output vector question representation corresponding to a training text question, and an output vector passage representation corresponding to a training text passage associated with the training text question, as compared to a previous training pass of the series of training passes.

* * * * *